United States Patent
Kim

(10) Patent No.: US 10,533,078 B2
(45) Date of Patent: * Jan. 14, 2020

(54) POLYMER FILM AND METHOD FOR PREPARING POLYMER FILM

(71) Applicant: KOLON INDUSTRIES, INC., Gwacheon-si (KR)

(72) Inventor: Yun-Jo Kim, Youngin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 92 days.

This patent is subject to a terminal disclaimer.

(21) Appl. No.: 15/515,713

(22) PCT Filed: Sep. 30, 2015

(86) PCT No.: PCT/KR2015/010298
§ 371 (c)(1),
(2) Date: Mar. 30, 2017

(87) PCT Pub. No.: WO2016/052984
PCT Pub. Date: Apr. 7, 2016

(65) Prior Publication Data
US 2017/0313832 A1    Nov. 2, 2017

(30) Foreign Application Priority Data

Sep. 30, 2014   (KR) ........................ 10-2014-0131683

(51) Int. Cl.
*B32B 27/02*   (2006.01)
*C08J 5/18*   (2006.01)
(Continued)

(52) U.S. Cl.
CPC .............. *C08J 5/18* (2013.01); *B60C 1/0008* (2013.01); *C08G 69/40* (2013.01);
(Continued)

(58) Field of Classification Search
CPC .............. C08L 77/02; C08L 2205/025; C08L 2205/03; C08L 23/00; C08L 77/00;
(Continued)

(56) References Cited

U.S. PATENT DOCUMENTS 4,617,207 A * 10/1986 Ueki ........................ C08J 5/18
264/176.1
5,075,408 A * 12/1991 Suzuki ................... C08G 18/12
528/76
(Continued)

FOREIGN PATENT DOCUMENTS

CN     103403072     11/2013
CN     103958580     7/2014
(Continued)

OTHER PUBLICATIONS

EPO, the Extended Search Report of EP 15847766.1 dated Apr. 12, 2018.
Korean Intellectual Property Office, International Search Report and Written Opinion of Application No. PCT/KR2015/010298, dated Jan. 22, 2016.

*Primary Examiner* — Lawrence D Ferguson
(74) *Attorney, Agent, or Firm* — Lex IP Meister, PLLC

(57) ABSTRACT

The present invention relates to a polymer film comprising a base film comprising polyamide-based resin; and two or more kinds of copolymers comprising polyamide-based segments and polyether-based segments, and a method for preparing the polymer film.

11 Claims, 1 Drawing Sheet

(51) Int. Cl.
*C08G 69/40* (2006.01)
*B60C 1/00* (2006.01)
*C09J 161/12* (2006.01)

(52) U.S. Cl.
CPC ....... *C08G 2380/00* (2013.01); *C08J 2377/02* (2013.01); *C08J 2377/06* (2013.01); *C08J 2477/02* (2013.01); *C09J 161/12* (2013.01); *C09J 2461/00* (2013.01); *C09J 2477/006* (2013.01)

(58) Field of Classification Search
CPC .. B60C 1/0008; C08G 2380/00; C08G 69/40; C08J 2377/02; C08J 2377/06; C08J 2477/02; C08J 5/18; C09D 177/02; C09J 161/12; C09J 2461/00; C09J 2477/006; C09J 7/25
See application file for complete search history.

(56) References Cited

U.S. PATENT DOCUMENTS

| | | |
|---|---|---|
| 9,492,981 B2 | 11/2016 | Song et al. |
| 2011/0056612 A1 | 3/2011 | Sugimoto |
| 2013/0059142 A1 | 3/2013 | Chung |

FOREIGN PATENT DOCUMENTS

| | | |
|---|---|---|
| EP | 2660274 | 11/2013 |
| JP | 2008-049749 | 3/2008 |
| JP | 2011-056812 | 3/2011 |
| JP | 2012-116392 | 6/2012 |
| KR | 10-2011-0000344 | 1/2011 |
| KR | 10-2011-0110023 | 10/2011 |
| KR | 10-2013-0035977 | 4/2013 |

* cited by examiner

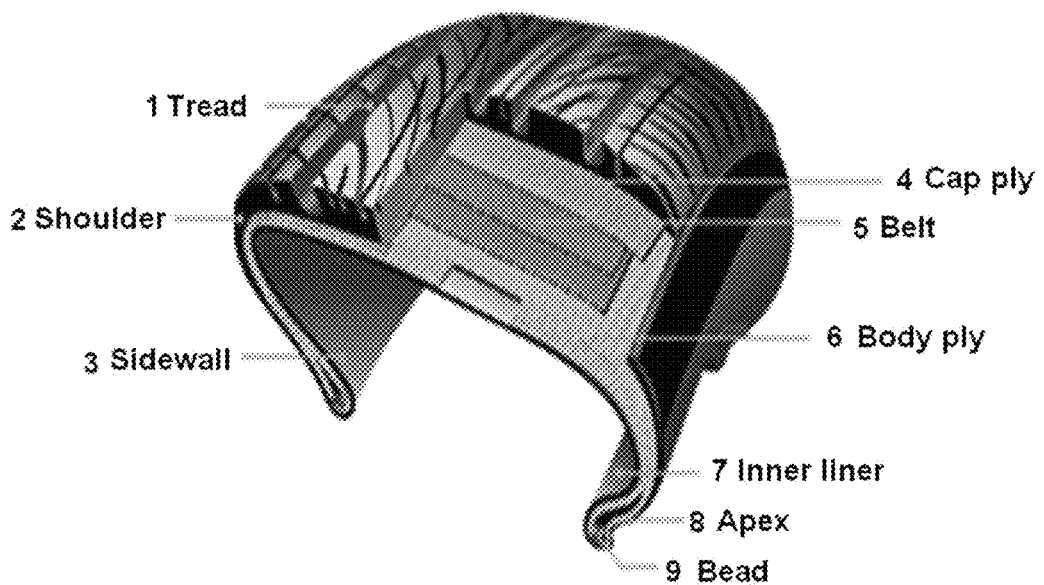

POLYMER FILM AND METHOD FOR PREPARING POLYMER FILM

CROSS-REFERENCE TO RELATED APPLICATION

This application claims the benefit of Korean Patent Application No. 10-2014-0131683 filed on Sep. 30, 2014 with the Korean Intellectual Property Office, the disclosures of which are herein incorporated by reference in their entirety.

FIELD OF THE INVENTION

The present invention relates to a polymer film and a method for preparing the same, more specifically, to a polymer film that can realize excellent gas barrier property even with a thin thickness, and thus, can reduce the weight of a tire and improve fuel efficiency of an automobile, and has mechanical properties such as high heat-resistant impact strength and durability, etc. as well as excellent formability, and a method for preparing the polymer film.

BACKGROUND OF THE INVENTION

A tire withstands the weight of an automobile, reduces impact from the road, and transfers driving force or braking force of an automobile to the ground. In general, a tire is a complex of fiber/steel/rubber, and has a structure as shown in FIG. 1.

Tread (1): a part contacting the road. It should afford frictional force required for driving, have good wear resistance, withstand external impact, and have low heat.

Body Ply, or Carcass (6): a cord layer in the tire. It should support the weight, withstand impact, and have high fatigue resistance to bending and stretching exercises during running.

Belt (5): It is located between the body plies, consists of steel wire in most cases, reduces external impact, and maintains wide tread to afford excellent vehicle running stability.

Side Wall (3): a rubber layer between a part below a shoulder (2) and bead (9). It protects the inner body ply (6).

Inner Liner (7): It is located inside the tire instead of a tube, and prevents air leakage to enable pneumatic tire.

BEAD (9): square or hexagonal wire bundle formed of rubber-coated steel wire. It positions and fixes the tire in a rim.

CAP PLY (4): a special cord located on a belt of a radial tire for some cars. It minimizes movement of the belt during running.

APEX (8): triangle rubber filler used to minimize dispersion of the bead, reduce external impact to protect the bead, and prevent air inflow during forming.

Recently, a tubeless tire in which high pressure air of 30 to 40 psi is injected is commonly used without using a tube, and to prevent air leakage during automobile running, an inner liner having high gas barrier property is positioned as the inner layer of the carcass.

Previously, a tire inner liner including rubber such as butyl rubber or halo butyl rubber, and the like having relatively low air permeability as a main ingredient was used, but to achieve sufficient gas barrier property of the inner liner, rubber content or inner liner thickness should be increased. However, if rubber content and tire thickness increase, total weight of the tire may increase and the fuel efficiency of an automobile may be degraded.

And, since the rubber ingredients have relatively low heat resistance, air pocket may be generated between rubber in the inner surface of a carcass layer and the inner liner, or the shape or physical property of the inner liner may be changed in a vulcanization process of a tire or in an automobile running process during which repeated deformations occur at high temperature. And, to bond the rubber ingredients to a carcass layer of a tire, a vulcanizer should be used or a vulcanization process should be applied, but sufficient adhesion could not be secured therewith.

Thus, in order to decrease the thickness and weight of an inner liner to reduce fuel efficiency, and reduce change in the shape or properties of an inner liner generated in a tire molding or running process, etc., various methods have been suggested.

However, previously known methods have limitations in maintaining excellent air permeability and formability of a tire while sufficiently decreasing the thickness and the weight of the inner liner. And, the inner liner manufactured by previously known methods exhibited a lot of problems such as property degradation or generation of cracks, and the like, in a tire manufacturing process during which repeated deformations occur at high temperature, or in an automobile running process during which repeated deformations occur and high heat is generated.

DETAILED DESCRIPTION OF THE INVENTION

Technical Problem

It is an object of the present invention to provide a polymer film that can realize excellent gas barrier property even with a thin thickness, and thus, can reduce the weight of a tire and improve the fuel efficiency of an automobile, and has mechanical properties such as high heat-resistant impact strength and durability, etc. as well as excellent formability It is another object of the present invention to provide a method for preparing the polymer film.

Technical Solution

A polymer film for an inner liner, comprising a base film comprising: polyamide-based resin; and two or more kinds of copolymers comprising polyamide-based segments and polyether-based segments, is provided herein.

Also, a method for preparing a polymer film for an inner liner, comprising the step of melting a mixture comprising polyamide-based resin; and two or more kinds of copolymers comprising polyamide-based segments and polyether-based segments at 200 to 300° C. and extruding it to form a base film, is provided herein.

Hereinafter, a polymer film and a method for preparing a polymer film according to specific embodiments of the invention will be explained in detail.

As used herein, a 'segment' means a part included in a copolymer, polymer or macromolecule, and includes a repeat unit having a designated chemical structure and a group or block, etc. consisting of such repeat units.

According to one embodiment of the present invention, a polymer film for an inner liner, comprising a base film comprising: polyamide-based resin; and two or more kinds of copolymers comprising polyamide-based segments and polyether-based segments, is provided.

As the result of the present inventors, it was confirmed through experiments that by using a base film prepared using two or more different kinds of copolymers together with polyamide-based resin, excellent gas barrier can be realized even with a thinner thickness, thus reducing the weight of a tire and improving the fuel efficiency of an automobile, and heat-resistant impact strength can be largely improved while securing mechanical properties such as high durability and fatigue resistance as well as excellent formability, and completed the present invention.

As explained above, the base film may comprise two or more kinds of copolymers comprising polyamide-based segments and polyether-based segments. Specifically, the two or more kinds of copolymers may comprise copolymers comprising different polyether-based segments. That is, the kind of the copolymers included in the base film may be classified according to the chemical structure of included polyether-based segment.

Since the base film uses two or more kinds of copolymers comprising different polyether-based segments, heat resistance and gas barrier of the base film can be mutually compensated, and trade-off due to specific property reinforcement can be inhibited, thus maximizing the properties. And, by using two or more kinds of copolymers comprising different polyether-based segments, the copolymers may have improved compatibility with polyamide-based resin, and thus, the polymer matrix of the base film may not only have further improved phase continuity but also secure high uniformity, thus improving the durability of the finally prepared polymer film.

Heat-resistant impact strength toward the transverse direction (TD) of the base film, measured after heat treating the base film at 170° C. for 1 hour according to ISO 8256 Method A, may be 800 to 4,000 kJ/m².

And, the ratio of heat-resistant impact strength toward the machine direction (MD) of the base film to heat-resistant impact strength toward the transverse direction (TD) of the base film, measured after heat treating the base film at 170° C. for 1 hour according to ISO 8256 Method A, may be 1 to 3.

The heat-resistant impact strength appears to be a property capable of directly or indirectly indicating the degree of rigidity of the bond at the interface of the polyamide-based resin and the copolymers comprising polyether-based segments, and it may be measured using an impact-tester, after heat treating at high temperature for a certain time under no-load. That is, immediately after heat treating in a hot air oven of 170° C. for 1 hour under no-tension, impact strengths for the transverse direction (TD) and the machine direction (MD) of the film may be measured using an impact tester, and the ratio of heat-resistant impact strengths may be calculated as the ratio thereof.

If the heat-resistant impact strength of the base film is too small, polymer interface may be easily broken due to external stress, and thus, the polymer film may not be suitable for use as an inner liner film. And, if the heat-resistant impact strength of the base film is too high, the polymer may become stiff, and the formability of the polymer film may be degraded in the process of manufacturing a tire.

Meanwhile, if the ratio of heat resistant impact strength toward the machine direction (MD) of the base film to heat resistant impact strength toward the transverse direction (TD) of the base film, measured after heat treating the base film at 170° C. for 1 hour according to ISO 8256 Method A, is too high, defects generated due to external stress may be rapidly propagated to one direction, thus lowering the durability of the polymer film, and if the ratio is too low, heat-resistant impact strength of the film (MD) may become low, thus lowering the durability of the polymer film.

Among the copolymers included in the base film, one kind of copolymer may comprise polyether-segments comprising repeat units of the following Chemical Formula 31:

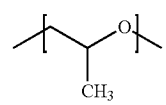

[Chemical Formula 31]

And, among the copolymers included in the base film, another kind of copolymer may comprise polyether-based segments comprising repeat units of the following Chemical Formula 32:

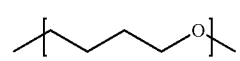

[Chemical Formula 32]

That is, the copolymers included in the base film may comprise one kind of copolymer comprising polyether-based segments comprising repeat units of the Chemical Formula 31 and polyamide-based segments, and another kind of copolymer comprising polyether-based segments comprising repeat units of the Chemical Formula 32 and polyamide-based segments. And, the copolymers included in the base film may further comprise copolymer other than the two kinds of copolymers.

The copolymer other than the two kinds of copolymers comprising polyether-based segments comprising repeat units of the Chemical Formula 31 and polyether-based segments comprising repeat units of the Chemical Formula 32, respectively, may comprise polyamide-based segments and polyether-based segments comprising repeat units of the following Chemical Formula 3.

[Chemical Formula 3]

In the Chemical Formula 3, $R_5$ is a C1-10 linear or branched alkylene group, n is an integer of 1 to 100, $R_6$ and $R_7$ may be identical or different, and, respectively, are a direct bond, —O—, —NH—, —COO— or —CONH—. However, in the Chemical Formula 3, a branched propylene group and a linear butylenes group are excluded from $R_5$.

By comprising one kind of copolymer comprising polyether-based segments comprising repeat units of the Chemical Formula 31 and polyamide-based segments, the base film may have not only higher elasticity but also lowered modulus. And, by comprising another kind of copolymer comprising polyether-based segments comprising repeat units of the Chemical Formula 32 and polyamide-based segments, the base film may have high gas barrier as well as high heat resistance.

And, since the base film comprises two kinds of copolymer comprising polyether-based segments comprising repeat units of the Chemical Formula 31 and polyether-based segments comprising repeat units of the Chemical Formula 32, respectively, it may have higher heat-resistant impact strength. As explained above, heat-resistant impact strength toward the transverse direction (TD) of the base film, measured after heat treating the base film at 170° C. for 1 hour according to ISO 8256 Method A, may be 800 to 4,000 kJ/m², and the ratio of heat-resistant impact strength toward the machine direction (MD) of the base film to heat-resistant impact strength toward the transverse direction (TD) of the base film, measured after heat treating the base film at 170° C. for 1 hour according to ISO 8256 Method A, may be 1 to 3.

Meanwhile, in the copolymers included in the base film, the weight ratio of one kind of copolymer comprising polyether-based segments comprising repeat units of the Chemical Formula 31 and polyamide-based segments, and another kind of copolymer comprising polyether-based segments comprising repeat units of the Chemical Formula 32 and polyamide-based segments, may be 1:9 to 9:1, or 2:8 to 8:2, or 1:1 to 1:5.

Meanwhile, in case a film for an inner liner is prepared using the polyamide-based resin alone, due to high modulus, when used as an inner liner, it cannot be sufficiently expanded under the elongation condition applied during tire manufacture, and continuously repeated deformations occurred during automobile running may be concentrated on one part of the film, thus generating crack or fracture in the polymer film used as an inner liner.

And, in case a film for an inner liner is prepared using copolymer comprising polyamide-based segments and polyether-based segments alone, it may not secure heat resistance sufficient for an inner liner, it may be easily thermally decomposed or the polymer chain may be easily cut even at low temperature, and due to the cutting of the polymer chain, elasticity of the prepared polymer film may be lowered or crystallinity may largely increase by heat, and thus, crack or fracture may be more remarkably generated during tire manufacture or automobile running.

To the contrary, since the polymer film according to one embodiment comprises polyamide-based resin and copolymers comprising polyamide-based segments and polyether-based segments together, it may have relatively low modulus as well as excellent gas barrier.

The polyamide-based resin may have a relative viscosity (sulfuric acid 96% solution) of 2.5 to 4.0, preferably 3.2 to 3.8. If the viscosity of the polyamide-based resin is less than 2.5, sufficient elongation may not be secured due to decrease in toughness, and thus, damage may be generated during tire manufacture or automobile running, and it may be difficult to secure gas barrier or formability, etc. required for an inner liner film. If the viscosity of the polyamide-based resin is greater than 4.0, the modulus or the viscosity of the prepared base film may become unnecessarily high, and when the polymer film is used as a tire inner liner, it may be difficult to have appropriate formability or elasticity.

The relative viscosity of the polyamide-based resin refers to relative viscosity measured using a sulfuric acid 96% solution at room temperature. Specifically, a specimen of polyamide-based resin (for example, 0.025 g specimen) is dissolved in a sulfuric acid 96% solution at various concentrations to prepare two or more measurement solutions (for example, a polyamide-based resin specimen is dissolved in 96% sulfuric acid to concentrations of 0.25 g/dL, 0.10 g/dL, 0.05 g/dL to prepare 3 measurement solutions), and then, the relative viscosity of the measurement solutions (for example, the ratio of the average passing time of the measurement solutions to the passing time of the sulfuric acid 96% solution through a viscosity tube) may be calculated using a viscosity tube at 25° C.

The kind of the polyamide-based resin is not significantly limited as long as it has a relative viscosity (sulfuric acid 96% solution) of 2.5 to 4.0. Specific examples of the polyamide-based resin that can be used in the base film may include nylon 6, nylon 66, nylon 46, nylon 11, nylon 12, nylon 610, nylon 612, copolymer of nylon 6/66, copolymer of nylon 6/66/610, nylon MXD6, nylon 6T, copolymer of nylon 6/6T, copolymer of nylon 66/PP, copolymer of nylon 66/PPS; or N-alkoxyalkylated products thereof, for example, a methoxymethylated product of 6-nylon, a methoxymethylated product of 6-610-nylon, and a methoxymethylated product of 612-nylon, and it is preferable to use nylon 6, nylon 66, nylon 46, nylon 11, nylon 12, nylon 610, or nylon 612.

And, the polyamide-based resin may be included in the base film by preparing the base film using monomers of the polyamide-based resin or precursor of the polyamide-based resin, as well as by using the resin itself.

The copolymer including polyamide-based segments and polyether-based segments may have a weight average molecular weight of 30,000 to 500,000 or 70,000 to 300,000, or 90,000 to 200,000. If the weight average molecular weight of the copolymer is less than 30,000, the prepared base film may not secure sufficient mechanical properties required for use as an inner liner film, and it may be difficult for the polymer film to secure sufficient gas barrier. And, if the weight average molecular weight of the copolymer is greater than 500,000, modulus or crystallinity of the base film may excessively increase when heated to high temperature, and elasticity or elasticity recovery rate required for an inner liner film may not be secured.

Herein, a weight average molecular weight means a weight average molecular weight in terms of polystyrene, measured by GPC method. In the process of measuring the weight average molecular weight in terms of polystyrene by GPC, commonly known analysis equipment, detectors such as a refractive index detector, etc., and columns for analysis may be used, and commonly applied temperature conditions, solvents, and flow rates may be applied. Specific examples of the measurement conditions may include a temperature of 30° C., a chloroform solvent and a flow rate of 1 mL/min.

In the base film, the content of the polyether-based segments included in the copolymer may be 2 wt % to 40 wt %, 3 wt % to 35 wt %, or 4 wt % to 30 wt %. The total content of the polyether-based segments included in the copolymers means the total wt % of the polyether-based segments of the two or more kinds of copolymers, based on the base film.

If the content of the polyether-based segments is less than 2 wt % based on total weight of the base film, modulus of the base film or polymer film may increase, and thus, when the polymer film is used as an inner liner, tire formability may be degraded, or property degradation due to repeated deformations may significantly occur. And, if the content of the polyether-based segments is greater than 40 wt % based on total weight of the film, the polymer film may not secure sufficient gas barrier property required for a tire inner liner, thus degrading tire performance, the reactivity to adhesive may be lowered, and thus, when the polymer film is used as an inner liner, it may be difficult to easily adhere to a carcass layer, and the elasticity of the base film may increase, and thus, it may be difficult to manufacture a uniform film.

The polyether-based segments may be bonded with the polyamide-based segments or may be dispersed between the polyamide-based resins, and they may inhibit growth of large crystal in the base film layer or prevent the base film layer from being easily broken during tire manufacture or automobile running.

Specific actions and effects resulting from the inclusion of two or more kinds of copolymers comprising different polyether-based segments in the base film are as explained above.

The polyamide-based segments may function for preventing significant increase in modulus property while giving mechanical properties over a certain level to the copolymer. In addition, as the polyamide-based segments are applied, the base film may have low air permeability while having a thin thickness, and may have sufficient heat resistance and chemical stability.

The polyamide-based segments of the copolymer may comprise the repeat units of the following Chemical Formula 1 or Chemical Formula 2.

[Chemical Formula 1]

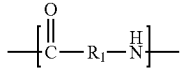

In the Chemical Formula 1, $R_1$ is a C1-20 linear or branched alkylene group, a C6-20 arylene group, or a C7-20 linear or branched arylalkylene group.

[Chemical Formula 2]

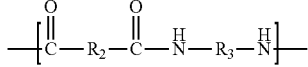

In the Chemical Formula 2, $R_2$ is a C1-20 linear or branched alkylene group or a C6-20 arylene group, and $R_3$ is a C1-20 linear or branched alkylene group, a C6-20 arylene group or a C7-20 linear or branched arylalkylene group.

The details of the polyether-based segments of the copolymer are as explained above.

In the base film, the polyamide-based resin and the above explained copolymers may be included at a weight ratio of 9:1 to 1:9, or 2:8 to 8:2. If the content of the polyamide-based resin is too small, the density or gas barrier of the base film may be lowered. And, if the content of the polyamide-based resin is too high, the modulus of the base film may excessively increase or tire formability may be degraded, and the polyamide-based resin may be crystallized under a high temperature environment during tire manufacture or automobile running, and cracks may be generated due to repeated deformations.

As explained above, the content of the polyether-based segments in the base film may be 2 wt % to 40 wt %, 3 wt % to 35 wt %, or 4 wt % to 30 wt %, and copolymer comprising a specific content of polyether-based segments may be used so as to control the content of the polyether-based segments in the base film according to the mixing ratio of the polyamide-based resin and the above explained copolymers. Specifically, each of the copolymers may comprise the polyether-based segments in the content of 5 wt % to 70 wt %, or 10 wt % to 60 wt %, or 15 wt % to 50 wt %.

Meanwhile, the base film may further comprise an olefin-based polymer compound. Specifically, the olefin-based polymer compound functions for increasing the softness of the base film and improving the capability of absorbing impact applied from the outside, and it may prevent change in the internal structure of the compound or polymer included in the base film and the resulting crystallization while significantly lowering the modulus of the base film.

The base film may further comprise the olefin-based polymer compound in the content of 0.1 wt % to 30 wt %, or 1 wt % to 25 wt %. If the content of the olefin-based polymer compound is too small, the actions and effects obtained by the olefin-based polymer compound may be insignificant. And, if the content of the olefin-based polymer compound is too high, the properties or effects exhibited by the polyamide-based resin and the copolymers may be reduced, and when a tire is manufactured using the polymer film as a film for an inner liner, gas barrier may be lowered.

The olefin-based polymer compound may comprise olefin-based polymer, olefin-based copolymer, olefin-based polymer copolymer grafted with dicarboxylic acid or acid anhydride thereof, or mixtures of two or more kinds thereof.

The olefin-based polymer may comprise polyethylene, polypropylene, or a mixture thereof.

The olefin-based copolymer may comprise ethylene-propylene copolymer.

As explained above, the olefin-based polymer compound may also comprise olefin-based polymer or copolymer grafted with dicarboxylic acid or acid anhydride thereof, wherein the dicarboxylic acid may include maleic acid, phthalic acid, itaconic acid, citraconic acid, alkenylsuccinic acid, cis-1,2,3,6-tetrahydrophthalic acid, 4-methyl-1,2,3,6-tetrahydrophthalic acid, or a mixture of two or more kinds thereof, and the anhydride of dicarboxylic acid may be anhydride of above described dicarboxylic acid.

Among the olefin-based polymer or copolymer grafted with dicarboxylic acid or acid anhydride thereof, the content of grafted dicarboxylic acid or acid anhydride thereof may be 0.05 wt % or more, preferably 0.1 wt % to 50 wt %, or 0.5 wt % to 10 wt %.

Such a grafting ratio of dicarboxylic acid or acid anhydride thereof may be measured from the result obtained by the acid-base titration of the olefin-based polymer compound. For example, the olefin-based polymer compound is added to 150 ml of xylene saturated with about 1 g of water, and refluxed for about 2 hours, followed by adding a small amount of a 1 wt % thymol blue-dimethylformamide solution, and slight excess titration with a 0.05N sodium hydroxide-ethylalcohol solution to obtain an ultramarine blue solution, and then, the solution is back-titrated with a 0.05N hydrochloric acid-isopropylalcohol solution until showing a yellow color to obtain the acid value, from which the amount of dicarboxylic acid grafted in the olefin-based polymer compound can be calculated.

The olefin-based polymer compound may have a density of 0.77 $g/cm^3$ to 0.95 $g/cm^3$, or 0.80 $g/cm^3$ to 0.93 $g/cm^3$.

The base film may have a thickness of 30 to 300 μm, preferably 40 to 250 μm, more preferably 40 to 200 μm. Thereby, the polymer film according to one embodiment of the invention may have low air permeability, for example oxygen permeability of 200 cc/($m^2$·24 hr·atm) or less, while having a thin thickness, compared to those previously known. The oxygen permeability may be a value measured at 25° C. and 60RH % according to ASTM D 1434 (Method M, Pressure Method), and it may be measured using a measuring apparatus such as a Gas Transmission Rate Tester (Model BR-1/BT-1, product from Toyoseiki Seisaku-Sho, Ltd.), etc.

The polymer film of one embodiment may be used as an inner liner of a tire.

Since the previously known inner liner used butyl rubber or copolymer of rubber component, it was relatively thickly positioned inside a carcass layer so as to secure gas barrier beyond a certain level. Thus, the previously known inner liner film had a weight amount to about 10% of the total tire weight, thus being an obstacle to improvement in automobile fuel efficiency. To the contrary, the polymer film of one embodiment not only has a 30% or less weight compared to the inner liner using butyl rubber or copolymer of rubber components, but also exhibits 20% or more improved gas barrier Meanwhile, the base film may further comprise one or more selected from the group consisting of a cross linking agent and a heat resistant agent.

By further comprising a cross linking agent, the crystallinity of the base film itself or a tendency of crystallization at high temperature may be lowered. Specifically, by using the cross linking agent, cross linking reactions may occur between the polymers used or synthesized in the preparation process of the base film, for example, (a) polyamide-based resin and (b) copolymers comprising polyamide-based segments and polyether-based segments, each or each other, thus lowering the crystallinity of the base film.

The base film may comprise the cross linking agent in the content of 0.05 wt % to 2 wt %, or 0.2 wt % to 1 wt %. If the content of the cross linking agent is too small, the cross linking degree between the polymers included in the base film may not be sufficient, and thus, crystallinity may not be sufficiently lowered. If the content of compounds comprising an oxazoline functional group is too high, compatibility with other components included in the base film may be lowered, thus deteriorating the properties of the inner liner film, or cross linking may be generated unnecessarily a lot in the base film, thus decreasing elasticity.

Meanwhile, the base film may further comprise a heat resistant agent. By further comprising a heat resistant agent, the degree of crystallization of the polymer may be largely lowered, and thus, even if left or exposed under high temperature environment for a long time, its own properties may not be significantly deteriorated. That is, as a heat resistant agent is added to the base film, crystallization or high degree of cure of the base film may be remarkably reduced even in a tire molding process, and generation of crack or damage in the inner liner may be prevented even in an automobile running process during which repeated deformations are applied and high temperature is generated.

The base film may comprise the heat resistant agent in the content of 0.05 wt % to 2.00 wt %, or 0.10 to 1.00 wt %. If the content of the heat resistant agent is too small, the effect of heat resistance improvement may be insignificant. And, if the content of the heat resistant agent is too high, the properties of the base film may be deteriorated, and there may be no substantial improvement in heat resistance according to the use content, thus unnecessarily increasing the cost of the final product.

Specific examples of the heat resistant agent may include aromatic amine-based compounds, hindered phenol-based compounds, phosphorus compounds, inorganic compounds, polyamide-based compounds, polyether-based compounds or mixture of two or more kinds thereof.

Meanwhile, the base film layer may be an undrawn film. If the base film layer is an undrawn film, it may have low modulus and high strain, and thus, it may be appropriately applied in a tire forming process during which high expansion is generated. And, since crystallization hardly occurs in the undrawn film, damage such as cracks, etc. may be prevented even if deformations repeatedly occur.

Meanwhile, the polymer film according to one embodiment may further comprise an adhesive layer that is formed at least one side of the base film and comprises resorcinol-formalin-latex (RFL)-based adhesive. Specifically, the polymer film according to one embodiment may further comprise an adhesive layer with a thickness of 0.1 μm to 20 μm that is formed at least one side of the base film and comprises resorcinol-formalin-latex (RFL)-based adhesive.

Meanwhile, the adhesive layer comprising resorcinol-formalin-latex (RFL)-based adhesive has excellent adhesion and adhesion maintaining performance to the base film layer and a tire carcass layer, and thus, it may prevent breaking of interface between an inner liner film and a carcass lays, which is generated by heat or repeated deformations during tire manufacture or automobile running, to give sufficient fatigue resistance to the polymer film.

The resorcinol-formalin-latex (RFL)-based adhesive may include 2 to 32 wt %, preferably 10 to 20 wt % of a condensate of resorcinol and formaldehyde, and 68 to 98 wt %, preferably 80 to 90 wt % of a latex.

The condensate of resorcinol and formaldehyde may be obtained by mixing resorcinol and formaldehyde at a mole ratio of 1:0.3 to 1:3.0, preferably 1:0.5 to 1:2.5, and conducting condensation. And, the condensate of resorcinol and formaldehyde may be included in the content of 2 wt % or more based on total weight of the adhesive layer in terms of a chemical reaction for excellent adhesion, and it may be included in the content of 32 wt % or less so as to secure adequate fatigue resistance.

The latex may be selected from the group consisting of natural rubber latex, styrene/butadiene rubber latex, acrylonitrile/butadiene rubber latex, chloroprene rubber latex and styrene/butadiene/vinylpyridine rubber latex, and a mixture thereof. The latex may be included in the content of 68 wt % or more based on total weight of the adhesive layer for flexibility and an effective cross linking reaction with rubber, and it may be included in the content of 98 wt % or less for a chemical reaction with a base film and stiffness of the adhesive layer.

The adhesive layer may have a thickness of 0.1 to 20 μm, preferably 0.1 to 10 μm, more preferably 0.2 to 7 μm, still more preferably 0.3 to 5 μm, and it may be formed on one side or both sides of the polymer film.

If the thickness of the adhesive layer is too thin, the adhesive layer itself may become thinner when a tire is inflated, cross linking adhesion between a carcass layer and a base film may be lowered, and stress may be concentrated on a part of the adhesive layer to degrade fatigue property. And, if the thickness of the adhesive layer is too thick, interface separation may occur in the adhesive layer to degrade fatigue property. And, in order to adhere the inner liner film to a carcass layer of a tire, an adhesive layer is generally formed on one side of the base film, but in case a multi-layered inner liner film is applied, or adhesion to rubber on both sides is required according to a tire molding method and construction design, for example when an inner liner film covers a bead part, the adhesive layer may be preferably formed on both sides of the base film.

Meanwhile, according to another embodiment of the present invention, a method for preparing a polymer film for an inner liner, comprising the step of melting a mixture comprising polyamide-based resin; and two or more kinds of copolymers comprising polyamide-based segments and polyether-based segments at 200 to 300° C. and extruding it to form a base film, is provided.

The above explained base film may be prepared using two or more different kinds of copolymers together with polyamide-based resin, and the prepared base film can realize excellent gas barrier even with a thinner thickness, thus reducing the weight of a tire and improving the fuel efficiency of an automobile, and can largely improve heat-resistant impact strength while securing mechanical properties such as high durability and fatigue resistance, etc. as well as excellent formability.

Since the base film is prepared using two or more kinds of copolymers comprising different polyether-based segments together with polyamide-based resin, heat resistance and gas barrier of the base film can be mutually compensated, and trade-off due to specific property reinforcement can be inhibited, thus maximizing the properties.

And, by using two or more kinds of copolymers comprising different polyether-based segments, the copolymers may have improved compatibility with polyamide-based resin, and thus, the polymer matrix of the base film may not only have further improved phase continuity but also secure high uniformity, thus improving the durability of the finally prepared polymer film.

Heat-resistant impact strength toward the transverse direction (TD) of the base film, measured after heat treating the base film at 170° C. for 1 hour according to ISO 8256 Method A, may be 800 to 4,000 kJ/m².

And, the ratio of heat-resistant impact strength toward the machine direction (MD) of the base film to heat-resistant impact strength toward the transverse direction (TD) of the base film, measured after heat treating the base film at 170° C. for 1 hour according to ISO 8256 Method A, may be 1 to 3.

The details of the heat-resistant impact strength and the ratio of heat-resistant impact strength toward the machine direction (MD) of the base film to heat-resistant impact strength toward the transverse direction (TD) of the base film are as explained above with regard to the polymer film of one embodiment.

And, the polymer film may have low modulus as well as sufficient strength, and since the degree of crystallization of the base film does not become so high through the molding process of high temperature of 100° C. or more or an elongation process, the modulus property, elasticity or elasticity recovery rate, etc. may not be significantly deteriorated, thus securing excellent formability.

The details of the polyamide-based resin and the copolymers comprising polyamide-based segments and polyether-based segments are as explained above with regard to the polymer film according to one embodiment.

Specific actions and effects resulting from the inclusion of two or more kinds of copolymers comprising different polyether-based segments are as explained above.

The two or more kinds of copolymers may comprise copolymers comprising different polyether-based segments. That is, the kind of the copolymers included in the base film may be classified according to the chemical structure of included polyether-based segment.

Among the copolymers, at least one kind of copolymer may comprise polyether-segments comprising repeat units of the following Chemical Formula 31:

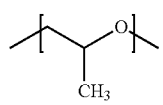

[Chemical Formula 31]

And, among the copolymers, another kind of copolymer may comprise polyether-based segments comprising repeat units of the following Chemical Formula 32:

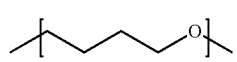

[Chemical Formula 32]

That is, in the preparation method of a polymer film of the above embodiment, one kind of copolymer comprising polyether-based segments comprising repeat units of the Chemical Formula 31 and polyamide-based segments, and another kind of copolymer comprising polyether-based segments comprising repeat units of the Chemical Formula 32 and polyamide-based segments may be used, and copolymer other than the two or more kinds of copolymer may be further used.

The copolymer other than the two kinds of copolymers comprising polyether-based segments comprising repeat units of the Chemical Formula 31 and polyether-based segments comprising repeat units of the Chemical Formula 32, respectively, may comprise polyamide-based segments and polyether-based segments comprising repeat units of the Chemical Formula 3.

The weight ratio of one kind of copolymer comprising polyether-based segments comprising repeat units of the Chemical Formula 31 and polyamide-based segments, and another kind of copolymer comprising polyether-based segments comprising repeat units of the Chemical Formula 32 and polyamide-based segments, may be 1:9 to 9:1, or 2:8 to 8:2, or 1:1 to 1:5.

Meanwhile, the weight ratio of the polyamide-based resin and the copolymers in the mixture may be 9:1 to 1:9, or 2:8 to 8:2. As explained above, if the content of the polyamide-based resin is too low, the density or gas barrier of the prepared base film may be lowered. And, if the content of the polyamide-based resin is too high, the modulus of the prepared base film may become too high or tire formability may be deteriorated, and under high temperature environment during tire manufacture or automobile running, the polyamide-based resin may be crystallized, and cracks may be generated due to repeated deformations.

And, the content of the polyether-based segments in the mixture may be 2 wt % to 40 wt %, 3 wt % to 35 wt %, or 4 wt % to 30 wt %. If the content of the polyether-based segments is less than 2 wt % in the mixture, modulus of the prepared base film may increase, and thus, tire formability may be degraded, or property degradation due to repeated deformations may significantly occur. And, if the content of the polyether-based segments is greater than 40 wt % in the mixture, gas barrier property of the prepared base film may be degraded or reactivity to adhesive may be lowered, and thus, it may be difficult to easily adhere to a carcass layer, and the elasticity of the base film may increase, and thus, it may be difficult to manufacture a uniform film.

As explained above, the content of the polyether-based segments in the base film may be 2 wt % to 40 wt %, 3 wt % to 35 wt %, or 4 wt % to 30 wt %, and copolymers comprising a specific content of polyether-based segments may be used so as to control the content of the polyether-based segments in the base film. Specifically, each copolymer may comprise the polyether-based segments in the content of 5 wt % to 70 wt %, or 10 wt % to 60 wt %, or 15 wt % to 50 wt %.

The mixture may further comprise a cross linking agent, and for example, the base film may comprise a cross linking agent in the content of 0.05 wt % to 2 wt %, or 0.2 wt % to 1 wt %.

The mixture of the polyamide-based resin and the copolymer may be fed to an extrusion die through a feeder maintained at a specific temperature, for example, 50 to 100° C. As the feeder is maintained at a temperature of 50 to 100° C., the mixture of the polyamide-based resin and the copolymers may have optimum properties such as density, etc., and thus, may easily move to the extrusion die or other parts of an extruder, and faulty feeding caused by the agglomeration of the mixture, etc. may be prevented, and a more uniform base film may be formed in the subsequent melting and extrusion process. The feeder functions for feeding introduced raw material to the extrusion die or other parts, the construction is not significantly limited, and it may be a common feeder included in an extruder for preparing polymer resin, etc.

Meanwhile, by melting and extruding the mixture fed to an extrusion die through the feeder at 200° C. to 300° C., or 230° C. to 280° C., a base film may be formed. Although the melting temperature should be higher than the melting point of the polyamide-based compound, if it is too high, carbonization or decomposition may occur to deteriorate the properties of the film, and bonding between the polyether-based resins may occur or orientation may be generated to the fiber arrangement direction, and thus, it may be unfavorable for preparing an undrawn film.

As the extrusion die, those known to be usable for the extrusion of polymer resin may be used without specific limitations, but it is preferable to use a T-type die so as to make the thickness of the base film more uniform or so as not to generate orientation in the base film.

Meanwhile, the step of forming the base film may comprise extruding the mixture into a film of a thickness of 30 to 300 μm. The thickness of the prepared film may be controlled by controlling extrusion conditions, for example, the discharge amount of the extruder or the gap of the extrusion die, or by changing the winding speed in the cooling process or recovery process of the extrudate.

In order to more uniformly control the thickness of the base film within the range of 30 to 300 μm, the die gap of the extrusion die may be controlled to 0.3 to 1.5 mm. In the step of forming the base film, if the die gap is too small, shear pressure and shear stress in the melt-extrusion process may become too high, and thus, uniform shape of the extruded film may not be formed and productivity may be lowered. And, if the die gap is too large, drawing of the melt extruded film may largely occur to generate orientation, and difference in the physical properties of MD and TD of the manufactured base film may increase.

Furthermore, in the manufacturing method of the polymer film, the thickness of the manufactured base film may be continuously measured, and the measurement result is fed back to control, for example, lip gap adjustment bolt of T-die, at the part of the extrusion die where non-uniform thickness appears, thus reducing deviation of the manufactured base film, thereby obtaining a film having a more uniform thickness. And, the measurement of the film thickness-feed back-control of extrusion die may constitute an automated process step by using automated system, for example Auto Die system, and the like.

Meanwhile, the method for manufacturing a polymer film may further comprise solidifying the base film formed by melting and extrusion in a cooling part maintained at a temperature of 5 to 40° C., preferably 10 to 30° C.

As the base film layer formed by melting and extrusion is solidified in a cooling part maintained at a temperature of 5 to 40° C., a film having more uniform thickness may be provided. By grounding or adhering the base film obtained by melting and extrusion to a cooling part maintained at optimum temperature, drawing may be substantially avoided, and the base film may be provided as an undrawn film.

Specifically, the solidifying step may comprise uniformly attaching the base film formed through melting and extrusion to a cooling roll maintained at a temperature of 5 to 40° C., using an air knife, an air nozzle, an electrostatic charging device (pinning device), a vacuum box, or a combination thereof.

By adhering the base film layer formed through melting and extrusion to the cooling roll using an air knife, an air nozzle, a pinning device, a vacuum box, or a combination thereof in the solidification step, blowing or partially non-uniform cooling of the base film layer after extrusion may be prevented, and thus, a film having more uniform thickness may be formed, and areas thicker or thinner than surrounding areas may not be substantially formed in the film.

Meanwhile, the molten substance extruded under the specific die gap condition may be attached or grounded to a cooling roll installed at a horizontal distance from a die exit of 7 to 150 mm, preferably 15 to 100 mm, to avoid drawing and orientation. The horizontal distance from a die exit to a cooling roll may be a distance between the die exit and a point at which the discharged molten substance is grounded to the cooling roll. If a linear distance between the die exit and the point at which a molten film is attached to the cooling roll is too small, uniform flow of the molten extruded resin is hindered, and thus, the film may be cooled unevenly, and if the distance if too large, inhibition of drawing of the film may not be achieved.

In the step of forming the base film, except the above explained steps and conditions, film extrusion conditions commonly used for manufacturing of a polymer film, for example, screw diameter, screw rotation speed, or line speed, and the like may be appropriately selected.

The step of forming a base film may further comprise adding a cross linking agent to the mixture. In the step of forming a base film, the mixture may be formed by mixing polyamide-based resin, two or more kinds of copolymers comprising polyamide-based segments and polyether-based segments, and a cross linking agent, simultaneously or at one time. And, the mixture may be also formed by sequentially adding the polyamide-based resin, copolymers and cross linking agent to a mixture or a reactor while mixing them.

The details of specific kind and use amount of the cross linking agent are as explained above with regard to the polymer film according to one embodiment, The step of forming a base film may further comprise adding a heat-resistant agent. The heat-resistant agent may be sequentially or simultaneously mixed with polyamide-based resin; and two or more kinds of copolymers comprising polyamide-based segments and polyether-based segments, and molten and extruded. And, the heat-resistant agent may be mixed with polyamide-based resin; and two or more kinds of copolymers comprising polyamide-based segments and polyether-based segments, by simple mixing and blending or compounding at 200° C. to 300° C.

The content of the heat-resistant agent in the prepared base film may be 0.05 wt % to 2.00 wt %, or 0.10 to 1.00 wt %. The details of the heat-resistant agent are as explained above with regard to the polymer film according to one embodiment.

In the step of forming a base film, the mixture comprising polyamide-based resin; and two or more kinds of copolymers comprising polyamide-based segments and polyether-based segments may further comprise an olefin-based polymer compound.

As explained above, the olefin-based polymer compound functions for increasing the softness of the base film and improving the capability of absorbing impact applied from the outside, and it may prevent change in the internal structure of the compound or polymer included in the base film and the resulting crystallization while significantly lowering the modulus of the base film.

The mixture may further comprise the olefin-based polymer compound in the content of 0.1 wt % to 30 wt %, or 1 wt % to 25 wt %.

The olefin-based polymer compound may comprise olefin-based polymer, olefin-based copolymer, olefin-based polymer copolymer grafted with dicarboxylic acid or acid anhydride thereof, or mixtures of two or more kinds thereof.

The olefin-based polymer compound may have a density of 0.77 g/cm$^3$ to 0.95 g/cm$^3$, or 0.80 g/cm$^3$ to 0.93 g/cm$^3$.

The details of the olefin-based polymer compound are as explained above with regard to the polymer film according to one embodiment, Meanwhile, the method for preparing a polymer film may comprise a step of forming an adhesive layer comprising resorcinol-formalin-latex (RFL)-based adhesive on at least one surface of the base film.

The adhesive layer comprising resorcinol-formalin-latex (RFL)-based adhesive may be formed by applying resorcinol-formalin-latex (RFL)-based adhesive on one surface of the base film, or by laminating an adhesive film comprising resorcinol-formalin-latex (RFL)-based adhesive on one side of the base film.

Preferably, the step of forming the adhesive layer may be progressed by coating resorcinol-formalin-latex (RFL)-based adhesive on one side or both sides of the base film, and then, drying. The formed adhesive layer may have a thickness of 0.1 to 20 μm, preferably 0.1 to 10 μm. The resorcinol-formalin-latex (RFL)-based adhesive may comprise 2 to 32 wt % of a condensate of resorcinol and formaldehyde, and 68 to 98 wt %, preferably 80 to 90 wt % of latex.

The details of the resorcinol-formalin-latex (RFL)-based adhesive with the above described specific composition are as explained above.

Commonly used application or coating method or apparatus may be used to apply the adhesive without specific limitations, but knife coating, bar coating, gravure coating or spray, or immersion may be used. However, knife coating, gravure coating or bar coating may be preferable for uniform coating of the adhesive.

After forming the adhesive layer on one side or both sides of the base film, drying and an adhesive reaction may be simultaneously progressed, but a heat treatment reaction step may be progressed after drying step considering reactivity of the adhesive, and the step of forming the adhesive layer and drying and reacting may be applied several times for thickness of the adhesive layer or application of multilayered adhesive. And, after coating the adhesive on the base film, a heat treatment reaction may be conducted by solidifying and reacting at 100~150° C. for approximately 30 seconds to 3 minutes.

In the step of forming a copolymer or mixture, or in the step of melting and extruding a copolymer, additives such as a heat-resistant antioxidant or a heat stabilizer, etc. may be further added.

Advantageous Effects

According to the present invention, polymer film that can realize excellent gas barrier property even with a thin thickness, and thus, can reduce the weight of a tire and improve the fuel efficiency of an automobile, and has mechanical properties such as high durability, fatigue resistance etc. as well as excellent formability, and a method for preparing the polymer film are provided.

And, the provided polymer film, when used as an inner liner of a tire, may have low modulus property as well as sufficient strength, and the degree of crystallization of the base film may not become so high even through the molding process of high temperature of 100° C. or more or an elongation process, thus securing excellent formability.

BRIEF DESCRIPTION OF THE DRAWINGS

FIG. 1 schematically shows the structure of a tire.

DETAILED DESCRIPTION OF THE EMBODIMENTS

Hereinafter, the present invention will be explained in detail with reference to the following examples. However, these examples are only to illustrate the invention and the scope of the invention is not limited thereto.

Example: Preparation of Polymer Film

Example 1

(1) Preparation of a Base Film

Polyamide-based resin (nylon 6) with a relative viscosity (sulfuric acid 96% solution) of 3.3 prepared from ε-caprolactam, copolymer resin with a weight average molecular weight of about 105,000 (comprising 25 wt % of polyether-based segments including a polytetramethylene oxide main chain and 75 wt % of polyamide-based segments derived from ε-caprolactam), and copolymer resin with a weight average molecular weight of about 115,000 (synthesized using 25 wt % of polyether-based segments including a poly(iso-propylene) oxide main chain with an amine end group, and 75 wt % of polyamide-based segments derived from ε-caprolactam) were mixed at a weight ratio of 5:2.5:2.5, and a cross linking agent styrene 2-isopropenyl-2-oxazoline copolymer and a heat resistant agent [a mixture of copper iodide and potassium iodide—the content of Cu in the mixture 7 wt %] were added thereto, thus preparing a mixture for preparing a base film. The content of the cross linking agent in the mixture was 0.5 wt %, and 0.3 wt % of the heat resistant agent was included.

And, the mixture was extruded at a temperature of 260° C. through a T type die (Die Gap—1.0 mm) while maintaining uniform flow of molten resin, and the molten resin was cooled and solidified in the shape of a film with uniform thickness using an air knife on the surface of a cooling roll that is controlled to 25° C. And, an undrawn base film having a thickness of 100 um was obtained at a speed of 15 m/min without passing drawing and heating sections.

(2) Coating of Adhesive

Resorcinol and formaldehyde were mixed at a mole ratio of 1:2, and then, condensed to obtain a condensate of resorcinol and formaldehyde. 12 wt % of the condensate of resorcinol and formaldehyde and 88 wt % of styrene/butadiene-1,3/vinylpyridine latex were mixed to obtain resorcinol-formalin-latex (RFL)-based adhesive of concentration of 20%.

And, the resorcinol-formalin-latex (RFL)-based adhesive was coated on both sides of the undrawn base film using a gravure coater, dried at 150° C. for 1 minute, and reacted to form adhesive layers of 2 μm thickness, respectively, on both sides.

Example 2

Polyamide-based resin with a relative viscosity (sulfuric acid 96% solution) of 3.8 [synthesized using ε-caprolactam, and hexamethylene diamine and adipic acid at a weight ratio of 94:6], copolymer resin with a weight average molecular weight of about 130,000 (comprising 40 wt % of polyether-based segments including a polytetramethylene oxide main chain and 60 wt % of polyamide-based segments derived from ε-caprolactam), and copolymer resin with a weight average molecular weight of about 85,000 (comprising 20 wt % of polyether-based segments including a poly(iso-propylene) oxide main chain with an amine end group, and 80 wt % of polyamide-based segments derived from ε-caprolactam) were mixed at a weight ratio of 4:4:2, and a heat resistant agent [a mixture of copper iodide and potassium iodide—the content of Cu in the mixture 7 wt %] was added thereto, thus preparing a mixture for preparing a base film. The content of the heat resistant agent in the mixture was 0.8 wt %.

And, the mixture was extruded at a temperature of 250° C. through a T type die (Die Gap—0.8 mm) while maintaining uniform flow of molten resin, and the molten resin was cooled and solidified in the shape of a film with uniform thickness using an air knife on the surface of a cooling roll that is controlled to 20° C. And, an undrawn base film having a thickness of 90 um was obtained at a speed of 10 m/min without passing drawing and heating sections.

(2) Coating of Adhesive

An adhesive layer identical to that of Example 1 was formed, except that the adhesive layer was dried and reacted at 140° C. for 2 minutes to form adhesive layers with each thickness of 5 μm on both sides.

Example 3

(1) Preparation of Base Film

Polyamide-based resin (nylon 6) with a relative viscosity (sulfuric acid 96% solution) of 3.5 prepared from ε-caprolactam, copolymer resin with a weight average molecular weight of about 75,000 (comprising 20 wt % of polyether-based segments including a polytetramethylene oxide main chain and 80 wt % of polyamide-based segments derived from ε-caprolactam), and copolymer resin with a weight average molecular weight of about 105,000 (comprising 25 wt % of polyether-based segments including a poly(iso-propylene) oxide main chain with an amine end group, and 75 wt % of polyamide-based segments derived from ε-caprolactam) were mixed at a weight ratio of 2:5:3, and a heat resistant agent [a mixture of copper iodide and potassium iodide—the content of Cu in the mixture 7 wt %] and ethylene-propylene copolymer (density 0.87 g/cm³) grafted with maleic anhydride (1.0 wt %) were added thereto, thus preparing a mixture for preparing a base film. In the mixture, the content of the heat resistant agent was 0.5 wt %, and the content of olefin-based copolymer was 15 wt %.

And, the mixture was extruded at a temperature of 250° C. through a T type die (Die Gap—0.8 mm) while maintaining uniform flow of molten resin, and the molten resin was cooled and solidified in the shape of a film with uniform thickness using an air knife on the surface of a cooling roll that is controlled to 18° C. And, an undrawn base film having a thickness of 150 um was obtained at a speed of 15 m/min without passing drawing and heating sections.

(2) Coating of Adhesive

Adhesive layers were formed on both sides of the base film, by the same method as Example 1.

Example 4

Polyamide-based resin with a relative viscosity (sulfuric acid 96% solution) of 3.8 [synthesized using ε-caprolactam, and hexamethylene diamine and adipic acid at a weight ratio of 94:6], copolymer resin with a weight average molecular weight of about 120,000 (comprising 50 wt % of polyether-based segments including a polytetramethylene oxide main chain and 50 wt % of polyamide-based segments derived from ε-caprolactam), and copolymer resin with a weight average molecular weight of about 95,000 (comprising 50 wt % of polyether-based segments including a poly(iso-propylene) oxide main chain with an amine end group, and 50 wt % of polyamide-based segments derived from ε-caprolactam) were mixed at a weight ratio of 8:1.5:0.5, and a heat resistant agent [a mixture of copper iodide and potassium iodide—the content of Cu in the mixture 7 wt %] was added thereto, thus preparing a mixture for preparing a base film. In the mixture, the content of the heat resistant agent was 0.3 wt %.

And, the mixture was extruded at a temperature of 260° C. through a T type die (Die Gap—0.8 mm) while maintaining uniform flow of molten resin, and the molten resin was cooled and solidified in the shape of a film with uniform thickness using an air knife on the surface of a cooling roll that is controlled to 18° C. And, an undrawn base film having a thickness of 70 um was obtained at a speed of 15 m/min without passing drawing and heating sections.

(2) Coating of Adhesive

Adhesive layers were formed by the same method as Example 1, except that adhesive layers with each thickness of 1 μm were formed on both sides of the base film.

Example 5

(1) Preparation of Base Film

Polyamide-based resin (nylon 6) with a relative viscosity (sulfuric acid 96% solution) of 3.3 prepared from ε-caprolactam, copolymer resin with a weight average molecular weight of about 85,000 (comprising 15 wt % of polyether-based segments including a polytetramethylene oxide main chain and 85 wt % of polyamide-based segments derived from ε-caprolactam), and copolymer resin with a weight average molecular weight of about 125,000 (comprising 35 wt % of polyether-based segments including a poly(iso-propylene) oxide main chain with an amine end group, and 65 wt % of polyamide-based segments derived from ε-caprolactam) were mixed at a weight ratio of 2.5:2.5:5, and a heat resistant agent [a mixture of copper iodide and potassium iodide—the content of Cu in the mixture 7 wt %] was added thereto, thus preparing a mixture for preparing a base film. The content of the heat resistant agent in the mixture was 0.2 wt %.

And, the mixture was extruded at a temperature of 245° C. through a T type die (Die Gap—1.2 mm) while maintaining uniform flow of molten resin, and the molten resin was cooled and solidified in the shape of a film with uniform thickness using an air knife on the surface of a cooling roll that is controlled to 22° C. And, an undrawn base film having a thickness of 100 um was obtained at a speed of 15 m/min without passing drawing and heating sections.

(2) Coating of Adhesive

Adhesive layers were formed by the same method as Example 1, except that adhesive layers with each thickness of 7 μm were formed on both sides of the base film.

Comparative Example: Preparation of Polymer Film

Comparative Example 1

(1) Preparation of Base Film 85 wt % of nylon 6 resin with a relative viscosity (sulfuric acid 96% solution) of 3.3, and 15 wt % of copolymer resin with a weight average molecular weight of about 45,000 (comprising 10 wt % of polyether-based segments including a polytetramethylene oxide main chain and 90 wt % of polyamide-based segments derived from ε-caprolactam) were mixed to obtain an undrawn base film with a thickness of 100 um by the same method as Example 1.

(2) Coating of Adhesive

Adhesive layers were formed on both sides of the base film by the same method as Example 1.

Experimental Example: Measurement of Properties of Polymer Film

Experimental Example

Experimental Example 1: Heat Resistant Impact Strength and Heat Resistant Impact Strength Ratio (MD/TD)

Heat resistant impact strength and heat resistant impact strength ratio of the base films obtained in Examples and Comparative Examples were measured as follows.

Heat resistant impact strength was measured using ISO 8256 Method A, and for the MD (Machine Direction) and TD (Transverse Direction) of the base film, each 10 specimens for evaluation were taken using a cutting device ISO 8256 Type 4.

Here, the specimen was cut such that the shape of the specimen for evaluation (specimen length×shoulder width×parallel specimen length×specimen width) became 60 mm×10 mm×25 mm×3 mm according to ISO 8256 type4, and the specimen for evaluation cut according to the standard was left under temperature of 23° C. and relative humidity of 50% for 24 hours, and then, heat treated in a hot air oven of 170° C. for 1 hour, and immediately after that, heat resistant impact strengths of the MD (Machine Direction) and TD (Transverse Direction) of the heat treated base film were measured each 10 times under temperature of 23° C. and relative humidity of 50% using a Pendulum Impact Tester, Zwick/Roell Company, Model HIT 5.5P according to ISO 8256 Method A, and the mean values of 8 values excluding the maximum and minimum were calculated.

When measuring the heat resistant impact strength, in order to minimize a deviation due to external environment, the specimens for evaluation were cut to a size required for measurement before heat treatment, and in order to minimize property change, measurement was completed within 15 minutes after heat treatment.

The heat resistant impact strengths for the MD (Machine Direction) and TD (Transverse Direction) of the base film were calculated according to the following Equation 1.

Heat resistant impact strength (kJ/m$^2$)=impact energy (kJ)/[film thickness (m)×specimen width (0.003 m)]  <Equation 1>

(wherein, the width of the specimen for evaluation was fixed to 3 mm)

And, the ratio of heat resistant impact strengths was calculated according to the following Equation 2.

Ratio of heat resistant impact strengths=(heat resistant impact strength of MD of film)/(heat resistant impact strength of TD of film)  <Equation 2>

Experimental Example 2: Oxygen Permeability Test

For the base films obtained in Examples and Comparative Examples, oxygen permeability was measured under 25° C. and 60RH % using a Gas Transmission Rate Tester (Model BR-1/BT-2, manufactured by Toyoseiki Seisaku-Sho Company) according to ASTM D 1434.

Experimental Example 3: Measurement of Formability

Using the polymer films of Examples and Comparative Examples as inner liners, each 100 tires were manufactured with a standard of 205R/65R16 During the tire manufacturing process, manufacturability and appearance were evaluated after preparing a green tire, and the final appearance of a tire was examined after vulcanization.

Here, when there was no crushing of the green tire or the vulcanized tire and the standard deviation of the diameter was within 5%, it was evaluated as 'good'. And, when the green tire or the vulcanized tire was crushed, and thus a tire was not properly manufactured, or the inner liner inside the tire was molten or torn and damaged, or when the standard deviation of the diameter was greater than 5%, it was evaluated as 'faulty'.

For the 100 tires manufactured using the polymer films of Examples and Comparative Examples as inner liners, the number of tires having good appearance was confirmed to evaluate formability, wherein the formability was calculated by the following Equation 3.

Formability (%)=The number of tires evaluated as 'good'/100(the number of manufactured tires)×100(%)  <Equation 3>

Experimental Example 4: Measurement of Tire Durability

The durability of a tire was tested and evaluated while increasing load, according to FMVSS139 tire durability measuring method. The measurement of durability was conducted by two methods of Endurance Test which increases load by Step Loading, and High Speed Test which increases speed, and it was confirmed whether or not crack was generated inside a tire, and it was indicated as 'good' when there was no crack, and as 'faulty' when crack was generated.

The final appearance of tires was evaluated by the method of Experimental Example 3, and 20 tires with 'good' appearance were selected, and Endurance Test and High Speed Test were progressed for each 10 tires to confirm whether or not crack was generated. And, after measuring durability for 10 tires, the durability of tires according to Endurance Test and High Speed Test was calculated by the following Equation 4, using the number of 'good' tires without 'crack' generation.

The durability of tires (%)=The number of 'good' tires/10(the number of evaluated tires)×100(%)  <Equation 4>

Experimental Example 5: Measurement of Internal Pressure Retention

For the tires manufactured in Experimental Example 3, 90 days internal pressure retention was measured at a temperature of 21° C. under pressure of 101.3 kPa according to ASTM F1112-06, as shown in the following Equation 5.

Internal pressure retention (%)={1−(internal pressure of tire at first evaluation−internal pressure of tire after 90 day standing)/(internal pressure of tire at first evaluation)}×100  <Equation 5>

The results of Experimental Examples 1 to 5 are shown in the following Table 5.

TABLE 1

| | Example 1 | Example 2 | Example 3 | Example 4 | Example 5 | Comparative Example 1 |
|---|---|---|---|---|---|---|
| Heat resistant impact strength(kJ/m$^2$; TD) | 1,625 | 3,150 | 2,218 | 985 | 1,475 | 530 |
| Ratio of heat resistant impact strengths(MD/TD) | 1.42 | 1.37 | 1.62 | 2.73 | 1.82 | 3.54 |
| Oxygen permeability [cm$^3$/(m$^2$ · 24 hr*atm)] | 66 | 89 | 112 | 45 | 119 | 18 |
| Formability(%) | 99 | 100 | 100 | 97 | 100 | 35 |
| Tire durability (%) Endurance Test | 100 | 100 | 100 | 90 | 100 | 10 |
| Tire durability (%) High Speed Test | 100 | 100 | 100 | 100 | 100 | 60 |
| Internal pressure retention(%) | 97.8 | 97.3 | 96.9 | 98.1 | 95.8 | 98.3 |

As shown in Table 1, it was confirmed that the polymer films obtained in Examples have heat resistant impact strength of about 985 kJ/m$^2$ or more and heat resistant impact strength ratio (MD/TD) of 2.8 or less, and thus, have a rigid bond at the copolymer interface and exhibit uniform properties to the direction of the film, and exhibit oxygen permeability of 120 cm$^3$/(m$^2$·24 hr*atm) or less even at a thickness of 70 μm to 150 μm, and thus, can realize excellent gas barrier property even with a thin thickness, and can secure high durability when applied as a tire as well as excellent formability.

The invention claimed is:

1. A polymer film for an inner liner, comprising a base film comprising: polyamide-based resin; and two or more kinds of copolymers comprising polyamide-based segments and polyether-based segments,
    wherein the two or more kinds of copolymers include copolymer comprising different polyether-based segments,
    wherein the thickness of the base film is 30 to 300 μm, and oxygen permeability measured at 25° C. and 60RH % according to the method of ASTM D 1434 is 200 cm$^3$/(m$^2$×24 hr×atm) or less.

2. The polymer film according to claim 1, wherein at least one kind of copolymer comprises polyether-segments comprising repeat units of the following Chemical Formula 31 among the copolymers:

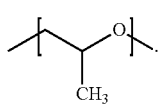

[Chemical Formula 31]

3. The polymer film according to claim 2, wherein another kind of copolymer comprises polyether-based segments comprising repeat units of the following Chemical Formula 32 among the copolymers:

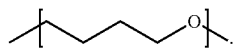

[Chemical Formula 32]

4. The polymer film according to claim 3, wherein the weight ratio of one kind of copolymer comprising polyether-based segments comprising repeat units of the Chemical Formula 31 and polyamide-based segments and another kind of copolymer comprising polyether-based segments comprising repeat units of the Chemical Formula 32 and polyamide-based segments, is 1:1 to 1:5.

5. The polymer film according to claim 1, wherein the total content of the polyether-based segments included in the base film is 2 wt % to 40 wt %.

6. The polymer film according to claim 1, wherein the base film further comprises an olefin-based polymer compound.

7. The polymer film according to claim 6, wherein the olefin-based polymer compound comprises one or more compounds selected form the group consisting of olefin-based polymer, olefin-based copolymer and olefin-based polymer or copolymer grafted with dicarboxylic acid or acid anhydride thereof.

8. The polymer film according to claim 6, wherein the base film comprises 0.1 wt % to 30 wt % of the olefin-based polymer compound.

9. The polymer film according to claim 1, wherein heat-resistant impact strength toward the transverse direction (TD) of the base film, measured after heat treating the base film at 170° C. for 1 hour according to ISO 8256 Method A, is 800 to 4,000 kJ/m$^2$.

10. The polymer film according to claim 9, wherein the ratio of heat-resistant impact strength toward the machine direction (MD) of the base film to heat-resistant impact strength toward the transverse direction (TD) of the base film, measured after heat treating the base film at 170° C. for 1 hour according to ISO 8256 Method A, is 1 to 3.

11. The polymer film according to claim 1, further comprising an adhesive layer with a thickness of 0.1 μm to 20 μm, formed on at least one side of the base film, and comprising resorcinol-formalin-latex (RFL)-based adhesive.

* * * * *